ized Patent

United States Patent [19]
Phillips et al.

[11] 4,168,491
[45] Sep. 18, 1979

[54] ENERGY DEMAND CONTROLLER AND METHOD THEREFOR

[75] Inventors: Alvin C. Phillips, Aurora; James S. Cumbach, Denver, both of Colo.

[73] Assignee: Phillips Control Corp., Denver, Colo.

[21] Appl. No.: 837,851

[22] Filed: Sep. 29, 1977

[51] Int. Cl.$^2$ .......................... H04B 3/54; H04Q 9/00; H02J 13/00

[52] U.S. Cl. .................................. 340/310 A; 307/39; 307/41; 340/147 R; 364/492

[58] Field of Search ............... 340/310 A, 216, 248 A, 340/248 C, 147 R, 661, 662, 663, 538; 307/35, 32, 34, 41, 38, 39, 126, 116, 140; 324/103 R; 219/485, 486, 483, 487, 492, 497, 506; 364/492, 493

[56] References Cited
U.S. PATENT DOCUMENTS

| | | | |
|---|---|---|---|
| 3,296,452 | 1/1967 | Williams | 307/62 |
| 3,602,703 | 8/1971 | Polenz | 364/492 |
| 3,652,838 | 3/1972 | Dillon et al. | 364/492 |
| 3,906,242 | 9/1975 | Stevenson | 307/38 |
| 3,937,978 | 2/1976 | Owenby | 307/41 |
| 3,970,861 | 7/1976 | McCollum | 307/35 |
| 3,987,308 | 10/1976 | Burch | 307/41 |
| 4,031,406 | 6/1977 | Leyde et al. | 307/41 |
| 4,034,233 | 7/1977 | Leyde | 307/41 |
| 4,064,485 | 12/1977 | Leyde | 307/39 |
| 4,100,426 | 7/1978 | Baranowski et al. | 307/41 |

*Primary Examiner*—John W. Caldwell, Sr.
*Assistant Examiner*—James J. Groody
*Attorney, Agent, or Firm*—Burton & Dorr

[57] ABSTRACT

An energy demand controller having a sensor for measuring the instantaneous power being delivered to a building, a thumb wheel switch for preselecting a power limit for use in the building, and circuitry for comparing the instantaneous power to the power limit and to switch off power to various heating zones within the building in order to maintain the instantaneous power below the preselected power limit. The control circuitry includes a cycling circuit only operative when the instantaneous power exceeds the measured power to deactivate a sufficient number of heater circuits in order to drop the instantaneous power below the preselected power limit for a predetermined time interval only. At the end of the predetermined time period, the deactivated heater circuits are turned back on. If the instantaneous power still exceeds the preselected power limit, then other zone heaters of sufficient number are likewise deactivated in a second predetermined time interval. As long as the instantaneous power exceeds the preselected power limit when the predetermined time intervals terminate, the heater circuits, in similar fashion, will be cyclically turned off and on so that heat loss in any given area is minimized. When all heater circuits within the predetermined time interval are deactivated, and the instantaneous power still exceeds the power limit, then the hot water heater is deactivated. If the instantaneous power still exceeds the preselected power limit, an alarm will then sound to inform the inhabitant of the building to either increase the preselected power limit or to deactivate other electrical circuits within the building.

17 Claims, 8 Drawing Figures

ENERGY DEMAND CONTROLLER AND METHOD THEREFOR

BACKGROUND OF THE INVENTION

1. Field of the Invention

The present invention relates generally to controllers and methods therefor for maintaining energy consumption at a predetermined value while minimizing inconvenience to users thereof, and more particularly, to an energy controller and method therefor designed for use in conventional residential housing minimizing noticable heat loss to the various rooms therein.

2. Description of the Prior Art

Power supply companies have traditionally billed industrial users based upon a "demand" billing rate. Such a rate structure is desirable since the power supply company must be capable of meeting peak supply demands by its various industrial users. Therefore, it is highly desirable to bill industrial users based upon their highest demand for generally a 15 minute interval during a given month. While industry has responded with a variety of approaches to substantially reduce peak demand levels during a given month through use of a variety of energy allocation devices, none of these prior art approaches have been found suitable for private residential use.

Power supply companies have traditionally billed residential consumers based upon what is commonly called the "declining block rate" basis. This "rate" basis for computing power consumption is based upon the concept that the residential user should pay for the power actually used. The philosophy behind this approach being that most consumers live within a predetermined amount of average power consumption so that the power supply company can properly allocate the power requirements to the residential community.

Power supply companies, however, in various states have started to adopt the "demand" rate structure for residential use as a way to lower the cost of electricity to homeowners.

One prior art approach adapted for use by homeowners using the "demand" rate structure is disclosed in "Energy Demand Controlling and Method Therefor", U.S. Pat. No. 4,090,062, issued May 16, 1978 wherein the inventors set forth an approach for providing a low-cost approach for energy priority and allocation in order to prevent peak energy usage from occurring. In that prior art approach, the inventors set forth a new and novel system for the allocation of energy in the various heating zones or rooms within the house by sequentially turning on heaters in each zone for a predetermined length of time, usually one second, thereby preventing the simultaneous activation of all heaters in all zones at the same time. The energy demand controller set forth in this prior art approach turns ON a first heating zone for only one second and continues to cycle through the remaining heating zones until it returns back to the first zone and turns that zone ON for an additional second. This cycling process repeats. In the event that the inhabitant of the house or building desires to use an appliance, a special override feature is provided so that while the appliance is being used, no cyclic heating in the zones occurs. Furthermore, the energy demand controller set forth in the above application further functioned when the temperature in each of the zones fell below a predetermined low value to activate the heater within that zone on a fulltime basis until the temperature was raised to a predetermined range. Whenever a given number of zones required such fulltime heating, the energy controller prevented any other appliance from being activated until the room temperature was brought up to within acceptable ranges.

Prior to the filing of this application, the inventors effectuated a patentability investigation to be performed. The results of that investigation are as follows:

| Inventor | Pat. No. | Date |
| --- | --- | --- |
| Williams | 3,296,452 | Jan. 3, 1967 |
| Polenz | 3,602,703 | Aug. 31, 1971 |
| Dillon, et al | 3,652,838 | March 28, 1972 |
| Stevenson | 3,906,242 | Sept. 16, 1975 |
| Owenby, Jr. | 3,937,978 | Feb. 10, 1976 |

The 1975 patent issued to Stevenson, U.S. Pat. No. 3,906,242, uses a load sensor to detect the electrical load being delivered to hotels and motels, colleges and schools, public housing and dorms, apartments, etc. Stevenson seeks to lower the peak electrical energy demand on a central electrical distribution network to specifically alleviate the occurrence of a power emergency. In accomplishing his goal, Stevenson senses the approach of an excessive demand peak and commences remotely, via radio signals, to disconnect simultaneously a number of interruptible loads such as hot water heaters. Whether or not such loads are disconnected is based upon energy consumption profiles predicted from past statistical records for such loads.

The 1967 patent to Williams, U.S. Pat. No. 3,296,452, seeks to efficiently utilize energy consumption during the demand interval. Williams seeks to have all loads operating at 100% of a predetermined demand interval value but not to exceed that amount for maximum efficiency. To accomplish this goal, Williams utilizes a differentially-responsive device having a first input produced at predetermined intervals, a second input from a variable quantity, a first pattern for establishing a first predetermined limit for the variable quantity, a second pattern operative with the first input for establishing a second predetermined limit pattern for a portion of each of the predetermined intervals, and a differential means receiving the first input, the first pattern, and the second pattern for responding to the difference between the input from the variable quantity in the sum of the limit patterns for each of the intervals. The circuit for accomplishing this is shown in FIG. 3 of Williams.

The 1976 patent to Owenby, Jr., U.S. Pat. No. 3,937,978, is adapted for hotels, motels, etc. in order to prevent under-voltage or freezing conditions from arising in rooms having occupants located therein. The Owenby approach utilizes a remote control system having various switches for controlling the electrical power supplied to various loads, electrical sensors for providing a signal corresponding to the variations of the electrical power from a prescribed value, and a restart circuit for receiving the signal from the sensor and having a timer for producing a timing signal representative of the time the signal from the electrical signal exists, a plurality of outputs coupled with the switches and responsive to the signal from the sensor for interrupting the power to the load, and a sequencer responsive to the timer to sequentially operate the output whereby power is returned to the load sequentially.

The patents issued to Dillon, U.S. Pat. No. 3,652,838 and to Polenz, U.S. Pat. No. 3,602,703 relate to complicated electrical priority control systems adaptable for the industrial environment.

None of the above approaches resulting from the search are related to nor solve the residential "demand" rate situation. The closest of the prior art approaches to solving this problem is presented by the inventors' own prior art system. The present invention, however, is new and novel over the inventors' prior energy demand controller. The present invention allows the user to preselect a level of power consumption thereby enabling the inhabitant of the house or building to predetermine his monthly bill. The preselected value of energy consumption is continually compared to the instantaneous power consumption delivered to the residential building. Whenever the instantaneous power consumption exceeds the predetermined level, one or a plurality of zone heaters are turned OFF within the building for a predetermined time interval, such as 16 seconds. Enough zones are turned OFF to cause the instantaneous power to be less than the desired power. At the end of the predetermined time period, the deactivated zone heaters are turned back ON and if the instantaneous power consumption still exceeds the predetermined value, other zone heaters are turned OFF in cyclical fashion for another 16 second period. This cycling continues until the instantaneous power no longer exceeds the predetermined value. Minimal heat loss occurs in the various rooms due to the thermal lag of the walls of the building while the heat in the respective zones is turned off. If all of the heaters are turned off in any given 16 second period, and the instantaneous power is greater than the power limit, then the power to the hot water heater is turned off. If the instantaneous power still exceeds the preselected power limit, an audible alarm sounds informing the inhabitant of the house to deactivate appliances, etc. to maintain the instantaneous power below the predetermined amount or to raise the predetermined level of use. None of the above prior art approaches set forth the novel approach of the present invention as set forth above.

OBJECTS OF THE INVENTION

It is an object of the present invention to provide a new and novel apparatus and method for controlling energy consumption within a building.

It is a further object of the present invention to provide a new and novel energy controller for maintaining energy consumption within a building at a preselected predetermined level.

It is another object of the present invention to provide a new and novel method for maintaining power consumption in a building having a first group of electrical users termed USERS 1 and a second group of electrical users termed USERS 2 and having the steps of selecting a desired level of power consumption for the building, determining when the actual power consumption in the building exceeds the desired level of power consumption, turning OFF power for a predetermined time interval to enough users in USERS 1 to lower the actual power consumption below the desired level of power consumption, turning ON power to all the deactivated users in response to the termination of a predetermined time interval, and cyclically repeating the above steps for different users in USERS 1 until all users in USERS 1 are uniformly deactivated.

It is a further object of the present invention to provide a new and novel method for maintaining power consumption in a building having separate electrical zone heating circuits and an electrical hot water heater having the steps of selecting a desired level of power consumption for the building, determining when the actual power consumption of the building exceeds the desired level of power consumption, turning OFF power for a predetermined time interval wherein enough zone heating circuits are deactivated to lower the actual power consumption below the desired level of power consumption, turning OFF power to the hot water heater whenever all zone heating circuits are turned off and the instantaneous power is still greater than the power limit, activating an alarm if the instantaneous power is still greater than the power limit, turning ON power to the deactivated zone heating circuits and hot water when the predetermined time interval terminates, and repeating this process in a cyclic fashion to uniformly deactivate all zone heating circuits until the instantaneous power consumption drops below the predetermined value.

It is a further object of the present invention to provide a new and novel energy demand controller for controlling the electrical power consumption to a plurality of users in a building having means for delivering electrical power to the building, means receptive of the delivered power for extending power on separate paths to each of the plurality of users, means cooperative with delivering means for generating a signal proportional to the amount of instantaneous power being delivered to the building, means for generating a signal representative of the predetermined amount of power, means receptive of the instantaneous power signal and of the predetermined power signal for producing an activation signal only when the instantaneous power signal exceeds the predetermined power signal and means operative upon the receipt of the activation signal for preventing the extension of power for as many separate paths and said extending means as necessary to reduce the instantaneous power signal below said predetermined signal.

Other objects, advantages and capabilities of the present invention will become more apparent as the description proceeds, taken in conjunction with the accompanying drawings.

SUMMARY OF THE INVENTION

Figure 1:
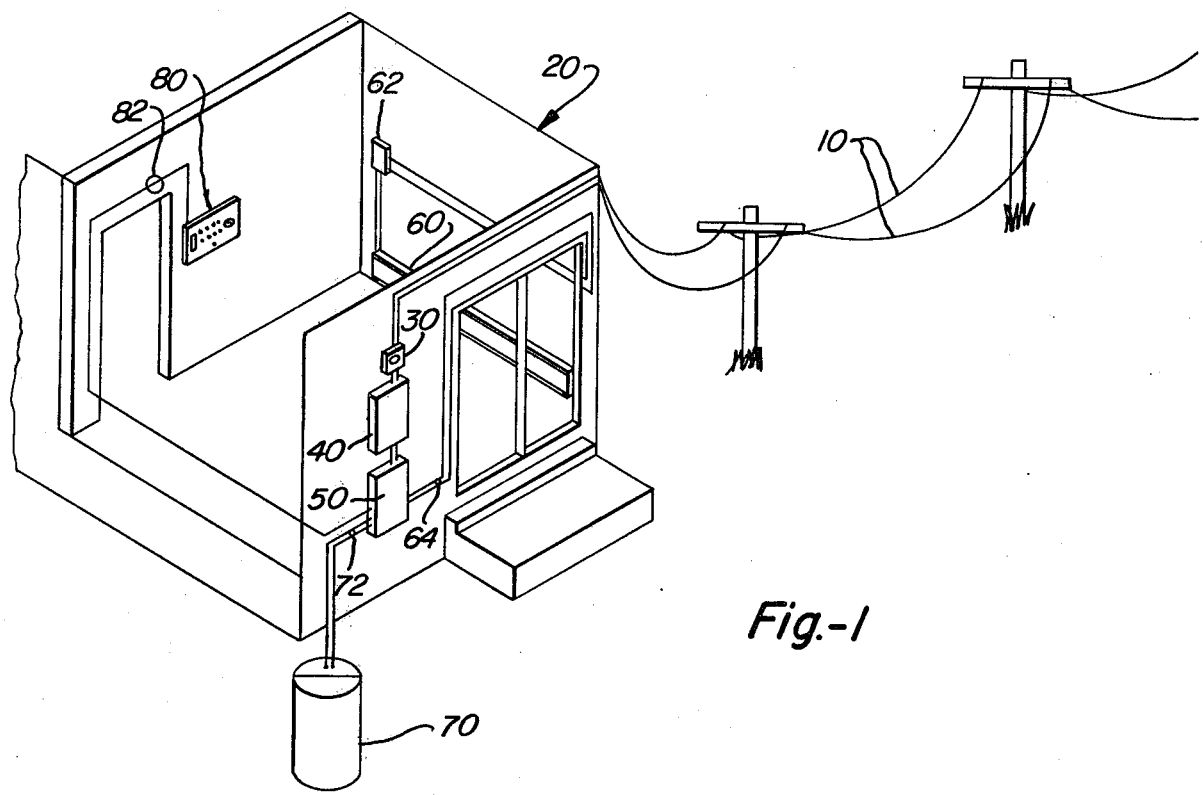
FIG. 1 is an illustration showing the energy controller of the present invention installed in a residential building.

The energy controller of the present invention essentially includes three separate components. The first component is a current sensor which measures the incoming power to a building. The second component is termed the controller which provides the inhabitant of the building with the means for preselecting the desired power limit, an alarm, and a set of lights indicating which circuits are deactivated. The third component is termed the switching panel which includes the electronic circuitry necessary to fulfill the objects of the present invention.

The switching panel receives the signals from the power sensor and compares the instantaneous power consumption with the predetermined power limit. If the instantaneous power exceeds the predetermined limit, then a comparator circuit outputs a pulse. A timer responsive to the outputted pulse produces a time frame of predetermined duration and the beginning of the time frame and the outputted pulse from the comparator both activate a cycling circuit. The cycling circuit, active only during the duration of the time frame, includes a digital sequencer which selectively deactivates enough electrical circuits within the building (in the preferred embodiment, zone heating circuits) to drop the instantaneous power below the predetermined power limit. At the end of the predetermined time interval, the cycling circuit restores power to the deactivated circuits and if the instantaneous power is still greater than the power limit, the comparator activates another pulse which in turn activates another time frame and the cycling circuit deactivates sufficient other electrical circuits to reduce the power below the desired level. The cycling circuit continually rotates the deactivation of electrical circuits in a cyclic fashion so that all circuits are uniformly deactivated. When such circuits correspond to heating zones within a house, the predetermined time interval is sufficiently less than the thermal lag of the house so that the turning OFF of heat in a particular zone is unnoticable to the inhabitant of the house. In the event that all electrical users of a specific group, for example, all electrical heating circuits, are deactivated, and the instantaneous power is still greater than the power limit, then the cycling circuit turns OFF power to another level of users such as, for example, the hot water heater. In the event the instantaneous power still exceeds the predetermined power limit, an alarm circuit activates an alarm to warn the inhabitant of the house of excessive power consumption.

The method of the present invention relates to a unique process by which electrical users are sequentially deactivated in a number sufficient to bring the instantaneous power below a predetermined power limit. The electrical users are deactivated for only a predetermined time period at which time they are reactivated and the remaining electrical users in the group are selectively deactivated during successive predetermined time intervals as long as the instantaneous power remains above the power limit.

GENERAL DESCRIPTION

The application of the present invention is generally described in FIG. 1. Power is conventionally delivered over power lines 10 to a house 20. The power conventionally enters the meter 30 which measures the amount of power being delivered and the rate of delivery to the house 20. The power is delivered from the meter 30 into a conventional circuit breaker 40 which houses the circuit breaker switches. In the event that there is excessive power usage within the house 20, a circuit breaker switch becomes activated to break the circuit containing the excessive usage. Power is then delivered from the circuit breakers 40 into a switching panel 50 which comprises a first part of the present invention. Power is then delivered from the switching panel to the various circuits within the house.

For example, one item in the house 20 using heat is strip heater 60 which is controlled by thermostat 62. The power is delivered over wires 64 from the switching panel 50 to the thermostat 62 and into the heater 60. It is well known in the building of new all-electric homes, that it is common to find four to twenty zones of heating in the various rooms of the house, each being separately controlled by a thermostat. In such situations, separate sets of wires 64 from separate breaker switches are delivered to each strip heater 60 for each zone. Furthermore, certain appliances in the house also use electricity such as, for example, a hot water heater 70. The hot water heater 70 receives its power over lines 72 from the switching panel 50 of the present invention. The meter 30, the circuit breaker 40, and the switching panel 50 are typically and commonly located on the exterior of the house 20. Located inside the house 20 are the strip heater 60 and the hot water heater 70 and the controller 80 of the present invention. The controller 80 is interconnected with the switching panel 50 by means of a set of wires collectively termed 82.

Figure 2:
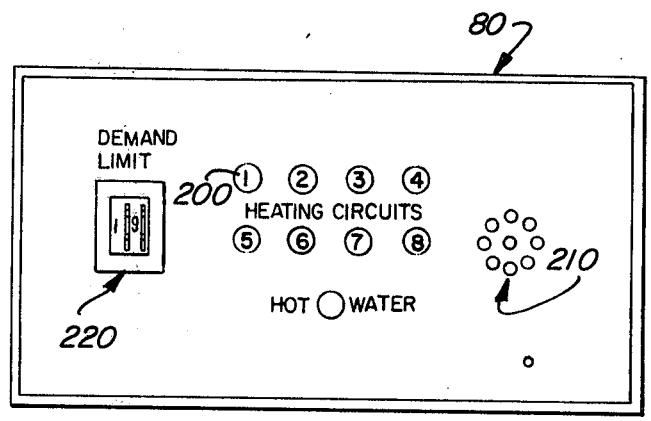
FIG. 2 is a front planar view of the operational control portion of the present invention.

The front panel of the controller 80 is shown in FIG. 2 to include a set of lights 200 having a light corresponding to each separate zone of heating (termed ZONES 1-8) and a light for the hot water heater 70. Also on the front panel of the controller 80 is found an alarm speaker 210 and a demand limit switch 220.

The system of the present invention set forth in FIGS. 1 and 2 operates in the following manner. Under normal living conditions, the inhabitants of house 20 utilize a variety of items using electrical power. Two common such items, and representing those most frequently used, are strip heaters and hot water heaters. Other users of electricity are freezers, electrical ranges, microwave ovens, dishwashers, clothes washers and clothes dryers. It is to be expressly understood that while such other users of electricity can be controlled by the system of the present invention as will become hereinafter presented, the invention set forth in the drawing is primarily related to application for zone and hot water heating.

In operation, the inhabitant of the house 20 sets the amount of "peak" electricity to be consumed during any given 15 minute time period by adjusting thumb wheel switches 220 on the controller 80. Thus, the inhabitant of the house can greatly control his monthly electrical bill. The controller 80 and the switching panel 50 of the present invention cooperate to sound an audible alarm in speaker 210 in the event that the power delivered into the house 20 exceeds the predetermined value set by switches 220. The controller 80 and the switching panel 50 of the present invention further cooperate to allocate and control the amount of electricity being used by the various users such as the strip heaters and the hot water heaters. In a manner to be subsequently explained in detail, the switching panel 50 measures all incoming power into the house 20 and compares it to a predetermined value from thumb wheel switches 220. Whenever the incoming power exceeds the predetermined amount of power, the switching panel prevents the delivery of power to a given heating zone. Thus, turning off heat to that area. The switching panel then remeasures the incoming power and if that power is still above the predetermined amount, another zone of heat will be turned off. The switching panel continues its measuring of incoming power and has the capability of turning off the heat to all of the rooms in the house. In the event that all of the rooms have the heat turned off and the power delivered into the house still exceeds the predetermined set value, then the power to the hot water heater will be turned off. If the incoming power still exceeds the predetermined power limit, an audible alarm will sound. With this warning, the inhabitant of the house 20 can take the appropriate action to either reduce the use of electricity such as by turning off appliances, etc. or to voluntarily raise his demand limit by modifying the thumb wheel switches 220.

While in the preferred embodiment each heating zone is separately controlled by a switch, it to be understood that in certain situations one heating zone may contain several heaters and that each heater may be separately controlled by a switch of the present invention or that several zones may be simultaneously controlled by a switch of the present invention. To alleviate any confusion pertaining to terminology, the claims appended hereto refer to "heating circuits" which embrace the above possible configurations and similar approaches.

DETAILED DESCRIPTION

Figure 3:
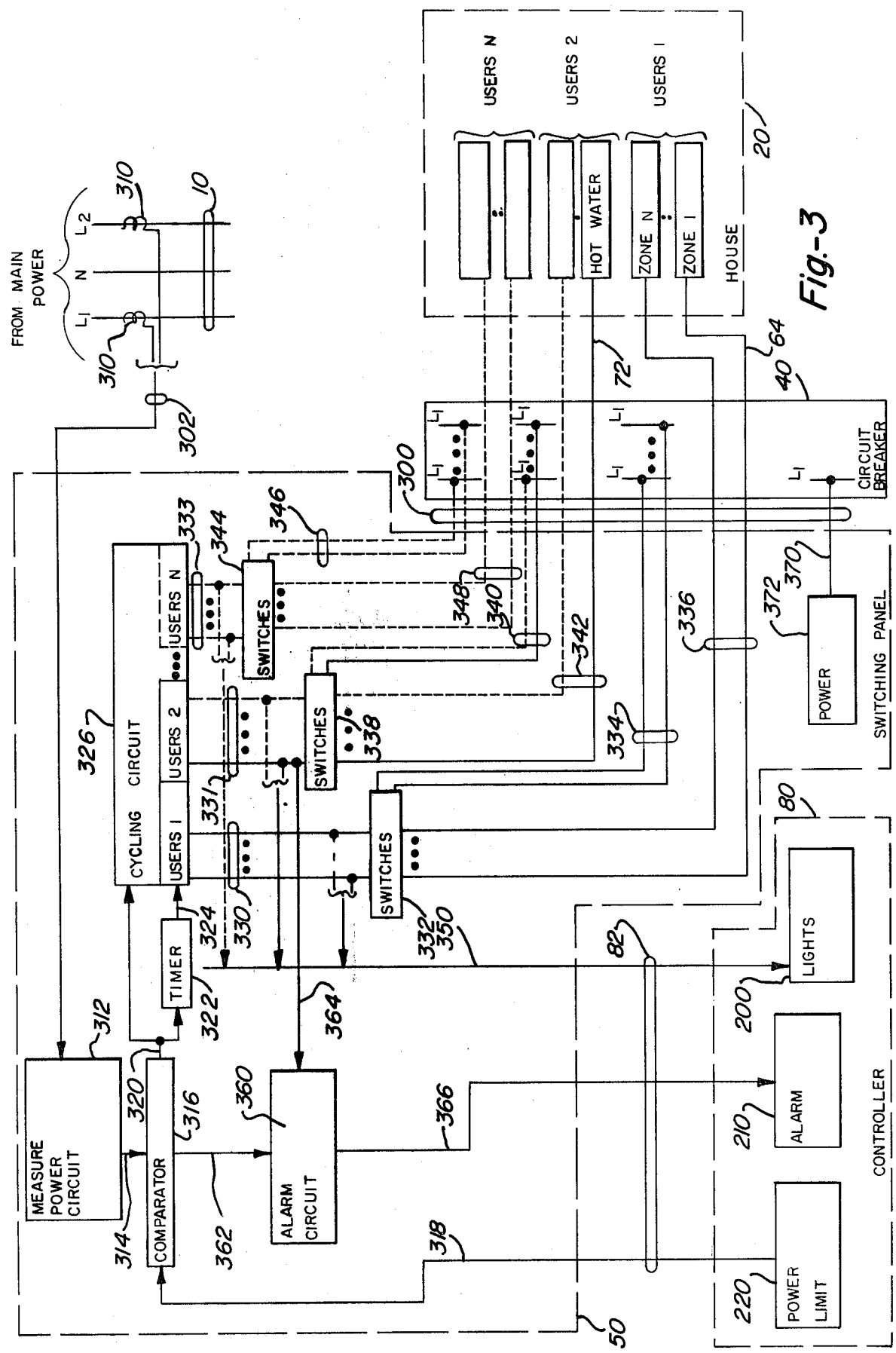
FIG. 3 is a block diagram representation of the major components of the energy controller of the present invention.

In FIG. 3, the system of the present invention is shown in greater detail to include substantially block form representation of the major components found within the system. For example, as previously discussed, the controller 80 includes a circuit for setting the power limit 220, a circuit for sounding an alarm 210, and a circuit for producing light indications 200.

The switching panel 50 of the present invention receives and sends signals over lead 82 to the controller 80 and further receives and sends power over leads 300 to the circuit breaker 40 and the house 20. Furthermore, the switching panel 50 receives a primary input signal representative of the total power being consumed by the house 20 over leads 302 from the main power line 10. As will be subsequently discussed in greater detail, the signals appearing on leads 302 are derived from lines L1 and L2 by means of current sensing coils 310. Current sensing coils 310 are conventional in the art and serve to output signals on leads 302 proportional to the amount of current flowing in lines L1 and L2. Of course, line N is the neutral or ground line of incoming power 10. The coils 310 can be placed at any convenient spot prior to the entry of the power into the circuit breaker 40. A most convenient location is actually within the circuit breaker 40 just after the power enters from the meter 30. The signals representative of the total power being consumed by the house 20 are delivered over leads 302 into the switching panel 50 and most specifically to the measured power circuit 312. The measured power circuit 312 functions to generate a DC level on lead 314 representative of the amount of power flowing through the main power lines 10. This signal appearing on lead 314 enters a comparator circuit 316. The comparator circuit also receives an input from the power limit circuit 220 and the controller 80 over lead 318. As will be discussed in greater detail, the power limit circuit has a manual input, such as thumb wheel switches, to enable a person to preselect the amount of power flowing through lines 10. The signal appearing on lead 318 is a DC voltage signal representative of the amount of the predetermined power as determined by the thumb wheel switches. The comparator 316 compares the DC levels appearing on leads 314 from the measured power and on 318 from the predetermined power level and if the measured power is lower than the predetermined value, then there is no output from the comparator 316 on leads 320 or 362. If, however, the voltage on lead 314 exceeds the voltage on lead 318, then the measured power is exceeding the predetermined amount and a signal appears on leads 320 and 362. The presence of a signal on lead 320 activates the system of the present invention in the following fashion. The signal appearing on lead 320 accesses a timer 322 which in turn generates a signal on lead 324 of a predetermined time length. This time length in the preferred embodiment is 16 seconds. Thus, whenever the comparator 316 outputs a signal on lead 320, the timer 322 activates to generate a pulse having a time duration of 16 seconds. The 16 second pulse appearing on lead 324, as well as the signal appearing on lead 320, both access to activate the cycling circuit 326.

The cycling circuit 326 controls the power delivered to groups of users. A first group of users, termed USERS 1, are the heating zones. A second group of users, termed USERS 2, would include, for example, the hot water heater, etc. Yet a last group of users, termed USERS N, could include other electrical circuits in the house. It is to be expressly understood that some electrical users may never have their power delivery controlled even though their individual power consumption is continually monitored as part of the instantaneous power consumption. In operation, the cycling circuit 326 shuts off power delivery to USERS 1, and when power is shut off to that group, USERS 2 has its power delivery terminated. In like fashion, delivery of power to USERS N can be terminated.

For example, in the preferred embodiment, USERS 1 comprises the various zones of heat in a house. Assuming that there are eight zones of heating in house 20, then there would be eight users in USERS 1. The cycling circuit 326, upon receipt of a signal on lead 320 and the start of the timing signal on lead 324 (i.e., the 16-second time frame) prevents delivery of power to one of the zones. Assume, for example, that zone 2 was turned off by the cycling circuit 326. If zone 2 was in the process of heating a room, then the overall power consumption being delivered through power lines 10 would be reduced by that amount of consumption. If the total power in lines 10 now drops below the power limit set in switches 220, then the cycling circuit 326 stops and does not turn off any more zones. If, however, the turning off of zone 2 does not reduce the actual consumption below the set amount, then the cycling circuit 326 will turn off zone 3 so that the power in the main power lines 10 is once again reduced. If this is still insufficient to reduce the power in line 10, and that power is still greater than the predetermined amount, then the cycling circuit 326 will turn off zone 4 and will continue turning off zones until the power in the main power line 10 drops below the power limit 220. If the cycling circuit 326 turns off the delivery of the power to all eight of the zones (i.e. USERS 1) and the measured power is still greater than the set power, then circuit 326 will turn off the power in like fashion to USERS 2.

In this fashion, all users groups, USERS 1, USERS 2, . . . , USERS n, can be effectively turned off by the cycling circuit 326 in an effort to keep the main power in lines 10 below the predetermined limit 220. In practical situations, such occurrences would very rarely happen. In fact, most of the activity would occur in the winter time on USERS 1 and USERS 2, primarily concerned with the heaters of USERS 1 and only the hot water heater of USERS 2.

It is important to note that a heating zone is turned off in its turn whether or not the heating zone is deriving power from lines 10. If it is not deriving power, it is apparent that the cycling circuit 326 will cycle and turn off the next zone.

The 16 second time interval appearing on lead 324 serves an important function in that at the end of the time interval, the cycling circuit 326 turns ON the delivery of the power to the users turned OFF in that time interval and the cycling circuit then starts terminating power to other user(s) in ensuing time intervals (if necessary) in order to uniformly rotate the turning OFF of power to all users. This feature is important to prevent the turning off of heat in one particular zone for a lengthy period of time. For example, if the power in the main power line 10 exceeds the predetermined power limit value 220 by an amount of power necessary to heat a given zone, then the cycling circuit 326 allocates the shut down of power to each of the different zones and, in a typical home, due to the thermal lag in each room, the turn off of power is not noticable by the inhabitant of the house 20. It is obvious that two or three such zones can be cyclically turned off in order to reduce the power consumption below the predetermined amount. This is the most common application of the system of the present invention during the winter time when, for example, a washer, dryer, range, or dishwasher is turned on drawing additional power for a short period of time. In such a case, a cycling circuit 326 will deliver the power to each of the different zones in such a fashion that there is not noticable heat loss in the zones by the inhabitants of the house yet keeping the power below the predetermined value.

The control signals for each of the users groups are delivered from the cycling group 326 to a set of solid state switches or relays. (It is to be understood that electromechanical relays may also be used with conventional design modifications.) For example, control signals for USERS 1 are delivered over leads 330 into a group of solid state switches 332 which in turn control the power delivered to the zones. It is only necessary to control the power on one of the lines, and as shown in FIG. 3, that line is L1 for each zone. L1 comes from the individual circuit breaker in the circuit breaker box 40 and is delivered over power line 334 into the switches 332. The switches 332 serve to switch the power ON or OFF in accordance with the signals appearing on lead 330. The operation of the switches for USERS 2 through N is similar in fashion. Power comes in on lines 340 to the switches 338 and are delivered out through lines 342 to the users in a house for USERS 2. Power is delivered on lines 346 into the switches 344 and are delivered out on leads 348 to USERS N.

Whenever a user has its power line turned off, a corresponding light is lit in the light bank 200 by means of control signals appearing on leads 350. Leads 350 are formed from leads 333, 331, and 330. In essence, whenever a control signal becomes active, a switch in switches 332, 338 or 344 becomes activated and a light turns on.

An alarm circuit 360 becomes activated when the comparator 316 detects the measured power to be greater than the power limit and delivers a signal on lead 362 to the alarm circuit 360 and when the simultaneous occurrence of a "down-the-line" user has its control lead activated over lead 364. In the example shown in FIG. 3, lead 364 is connected to the hot water user in USERS 2. Therefore, when all eight zones of heat are turned off in USERS 1 and power is OFF to the hot water heater in USERS 2, a signal is produced on lead 364 which, in combination with the signal on lead 362, generates a signal on lead 366 to activate the alarm circuit 210. In this situation, the alarm notifies the inhabitant of the house that all heat in the house is turned off and that the heat in the hot water has also been turned off and that the instantaneous power is still greater than the power limit then the inhabitant should take some corrective measures. It is to be expressly understood that the alarm circuit 360 can be designed to be activated by any one of the control leads appearing in leads 330, 331 or 333.

Power to the system of the present invention is also derived from the circuit breaker over line 370 which is delivered into a power supply circuit 372. Power supplies are conventional and only the desired voltage levels will be indicated on the remaining drawings of the preferred embodiments.

Figure 4:
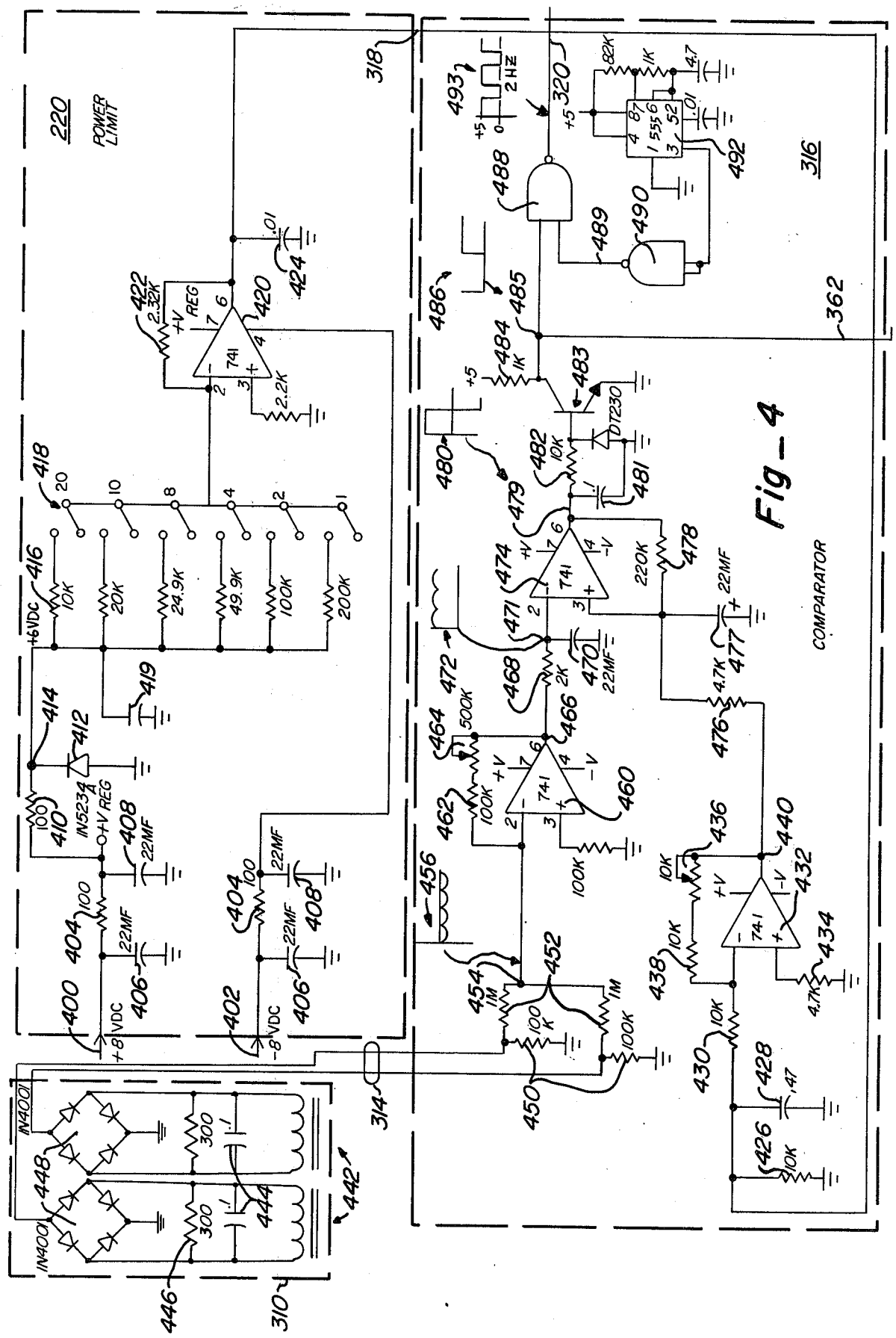
FIG. 4 is a detailed schematic representation showing one embodiment of the power limit and comparator sections of the energy controller of the present invention.

In FIG. 4 are shown the details of the measured power circuit 312, the comparator circuit 316, and the power limit circuit 220.

The power limit circuit 220 receives its power remotely from the switching panel 50. The power is ±8 VDC which appears on lines 400 and 402. The power is delivered through a seris resistor 404 and shunting capacitors 406 and 408. The resistor 404 and capacitors 406 and 408 serve to eliminate any noise appearing on lines 400 and 402 due to the long length which may occur between the position of the controller 80 and the switching panel 50. The +8 VDC is delivered through a series resistor 410 and across a zener diode 412. At node 414, the combination resistor 410 and zener diode 412 produce a steady 6 VDC. That voltage is then delivered into a resistor network 416 and a shunting noise capacitor 419. The resistor network 416 is interconnected with a thumb wheel switch 418 whereby any value up to, for example, 39 kilowatts of predetermined power can be preselected appropriately. For example, if 30 kilowatts is selected as the predetermined high, the switch 20 and the switch 10 are activated to put in parallel a 10 Kohm and 20 Kohm resistance in line with the input of operational amplifier 420. The operational amplifier is a set gain amplifier whose model number is shown and appropriately interconnected with power, ground, and resistance as shown. The stacked resistor network 416 in cooperation with the thumb wheel switches 418 serve to deliver a predetermined amount of power to the input of operational amplifier 420. That input is appropriately amplified by a constant amount as determined by resistor 422 and is delivered onto lead 318 which also has a noise capacitor 424 shunting to ground. The signal is delivered over lead 318 from the controller 80 back to the remote switching panel 50.

In switching panel 50 is the comparator circuit as shown in FIG. 3 and lead 318 first encounters noise protection resistor 426 and capacitor 428. The signal then accesses a series resistor 430 to enter the MINUS input of operational amplifier 432. The PLUS input of the operational amplifier 432 is grounded through resistor 434. Operational amplifier 432 is a variable gain amplifier whose gain is determined by resistor 436 in combination with resistor 438. By adjusting the rheostat of resistor 436, the gain of the operational amplifier 432 can be appropriately adjusted. The voltage appearing at node 440 is designed to be a predetermined value having the following relationship. If the predetermined peak kilowatt condition is 30 kilowatts as determined by the thumb wheel switches 418, the voltage appearing at node 440 is 3 volts. If the preselected kilowatt peak voltage is 2 kilowatts as determined by the thumb wheel switches 418, then the voltage at node 440 is 0.2 volts. The value of the voltage at node 440 is set to be 10% of the value of the peak kilowatt. This relationship was arrived at to provide ease in manufacturing, testing and maintenance. However, it is to be understood that any appropriate scaling can be used.

The sensors 310 conventionally detect the amount of power flowing through lines L1 and L2 by means of an inductive coupling designated 442 in FIG. 4. Capacitors 444 eliminate any high frequency noise and resistors 446 loads the inductance to prevent saturation. The detected voltage signal from each line is delivered into a full wave rectifying bridge 448 and the full wave negative going signal is delivered into the comparator 316 over leads 314. The signals from lines L1 and L2 are summed together by means of resistors 450 and 452. The combined voltage appearing at node 454 is a full wave rectify negative going signal graphically shown by diagram 456. That signal is delivered into the MINUS input of operational amplifier 460. Operational amplifier 460 is interconnected to operate as an inverting summing variable gain amplifier whose gain is determined by resistors 462 and 464. The output appearing at node 466 is an amplified version of the waveform 456 except that it is positive going. That signal enters the resistor 468 capacitor 470 combination to provide a voltage level substantially receptive of the positive going DC value of the full wave rectifying circuit as shown by curve 472. The voltage level appearing at node 471 is equal to 10% of the kilowatts flowing through lines 10. Resistor 464 is appropriately adjusted to provide for this relationship. Therefore, if the power being sensed is 30 kilowatts, the voltage at node 471 is 3 volts.

At this stage in the discussion, it is apparent that a voltage signal appearing at node 471 is proportional to the level of actual power consumption in lines 10 while at the same time a predetermined level appears at 440 representative of a desired level of power consumption. These two signals are now fed into a comparator operational amplifier 474. The input from node 471 is fed directly into the MINUS input of the operational amplifier 474 while the signal appearing at node 440 is fed into resistor 476 to the PLUS input being shunted through a noise capacitor 477. It is further delivered through resistor 478 to the output 479 of the operational amplifier 474. The operational amplifier operates in a conventional fashion to provide one of two signals on lead 479. The first signal as shown in curve 480, is a +8 VDC whenever the power in the lines 10 is less than the desired power while a −8 VDC signal is generated whenever the power being measured is greater than the desired power level.

Therefore, on lead 479, a distinct switching occurs indicative of whether or not the measured power is above or below the desired power consumption. Any oscillations due to the sudden switching from a high voltage to a low voltage are eliminated by capacitor 481 shunting such oscillations to ground. The signal on lead 479 is fed through resistor 482 to the base of transistor 483 which has its emitter grounded. The collector of transistor 483 is biased to through resistor 484 to positive voltage. The collector of transistor 483 is delivered to node 485 and the wave form at that node is shown by curve 486 as a zero voltage signal corresponding to the +8 VDC signal in curve 480 and a +5 VDC signal corresponding to the −8 VDC signal in curve 480. The purpose of transistor 483 is to convert to a proper voltage level for operation by the ensuing digital circuitry.

The signal appearing at node 485 is delivered into a NAND-gate 488. The other input of NAND-gate 488 is delivered over lead 489 from NAND-gate 490 which in turn is driven by the output of a clock circuit 492. The clock circuit 492 is a conventional timing integrated chip and the capacitors and resistors are arranged thereon to provide a series of pulses on lead 320 which is graphically shown in curve 493 as a series negative going pulses having a frequency of 2 hertz. It is to be noted that the pulses represented in circuit 492 appear on lead 320 only when the power being measured exceeds the predetermined amount. At all othe times, the voltage appearing on lead 320 is +5 volts.

Figure 5:
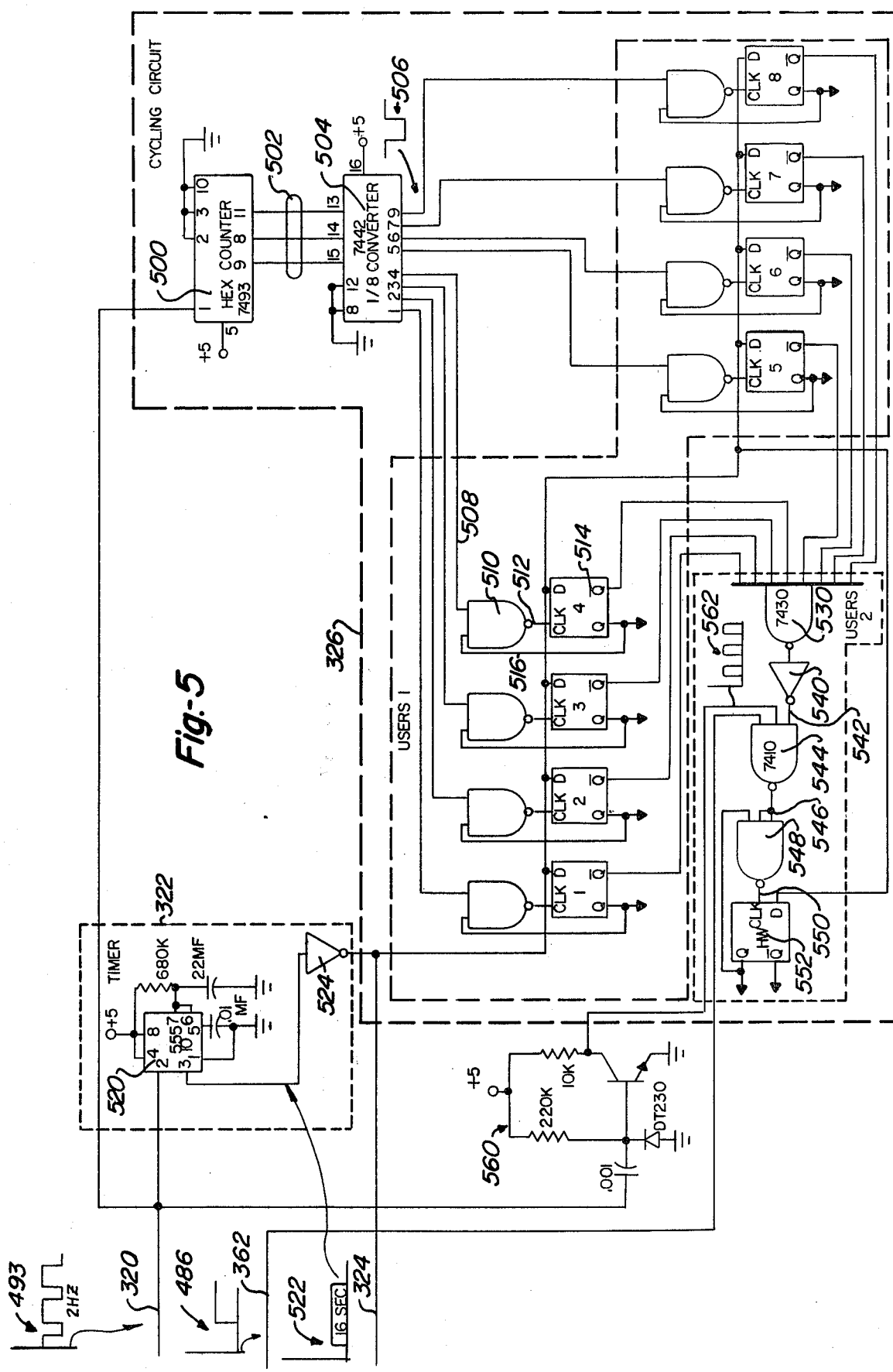
FIG. 5 is a detailed schematic representation of the timer and cycling circuit of the energy controller of the present invention.

In FIG. 5 are shown the details of the timer 322 and the cycling circuit 326. The cycling circuit receives the 2 Hz signal appearing on lead 320 (as shown in curve 493) in a hex counter 500. The hex counter is conventional and is shown in FIG. 5 to provide a roundrobin counting technique from 000,001, . . . 111,000. The hex output appearing on lead 502 is delivered into a 1-out-of-8 converter 504 which decodes the binary signals appearing on leads 502 to provide a discrete output for each separate state appearing on lead 502. These 1-out-of-8 signals control 8 separate circuits corresponding to the heating zones 1 through 8 of the USERS 1 switches.

For example, if the hex code appearing on lead 502 is 011, then output 4 of the 1-out-of-8 converter 504 goes low as shown by wave 506. All of the other outputs are held high. The low signal is delivered on lead 508 to NAND-gate 510. A low condition on one input of a NAND-gate such as 510, causes the output 512 of the NAND-gate 510 to go high. This high activates the clock input of a flip-flop 514. Whenever a high signal appears on the clock input to a flip-flop, the value appearing at D is extended to the Q output. Assuming for the moment that the value of D is low, and the value of Q is low which is fed back over lead 516 to the remaining input of NAND-gate 510 thereby locking the value of lead 512 into a high condition. The remaining NAND-flip-flop arrangements function in the same way and will not be discussed further.

It is readily apparent, assuming the D inputs of all of the flip-flops are held low, that with each successive pulse in the 2 Hz pulse train appearing on lead 320, each of the flip-flops will be stabilized in the low value at the Q outputs. Therefore, in our example of having the hex counter initially in position 4, each successive pulse thereafter would activate Quads 5, 6, 7, 8, 1, 2, 3, rapidly into the Q equals low state. It is likewise apparent, that if the value of the D input is high, then the Q output of the flip-flops will remain high.

Whether or not D is high or low is determined by timer 322. Timer 322 is composed of a conventional timing integrated circuit 520 which receives its input for activation from lead 320. The timer 520 is interconnected so that once activated, it generates a 16 second positive going pulse as shown by curve 522 in FIG. 5. It is important to note that the timer 520 becomes activated by the first pulse appearing on lead 320 and each subsequent pulse appearing thereon is ignored. The pulses generated on lead 320 are only generated whenever the measured power exceeds the predetermined set power. If the measured power is lower than the predetermined set value of power, then the timer 322 remains deactivated as well as the cycling circuit 326. This discussion assumes only that the measured power exceeds the predetermined power.

The positive going 16 second square wave pulse is delivered through an inverter 524. Thus, a 16 second low pulse is generated and it is during that time only that the Q outputs of the flip-flop can achieve the low state. Therefore, in our example when output 4 of the 1-out-of-8 converter 504 goes low, at the same time the value of D of flip-flop 514 is low and in the manner previously discussed, 510 and 514 cooperate to quickly latch Q into the low state. Thus even though the 1-out-of-8 converter advances to activate QUAD 5 on the next 2 Hz pulse coming in, the output of flip-flop 514 is held low by this latching arrangement. When, however, the 16 second pulse becomes high (at the end of the 16 second duration), the value of D is high which is clocked into the value of Q which becomes high, which causes the circuits 510 and 145 to undergo a transition so that the output Q is high and both inputs to 510 are high.

The operation of this circuit as it relates to the system as a whole will now be discussed by means of an example. Assume that in our house 20, all of the heaters are on and heating their respective zones within the house 20. Also assume that due to other uses occurring in the house such as appliances and lights being turned on, the power being delivered exceeds the predetermined amount so that a pulse appears on lead 320. Further assume that if two of the zones of heat were turned off, the power would fall below the predetermined amount. Therefore, the first pulse appearing on lead 320 activates the timer 520 and causes a 16 second time frame to be generated. That same pulse, further assuming we are on output 4 of the 1-out-of-8 converter 504 causes a Q output of flip-flop 514 to go low, thereby latching the circuit into the low state. It is to be noted that the Q outputs of all of the other flip-flops are high. In a manner to be subsequently discussed, this low signal causes the heat to that corresponding zone to be turned off, thereby reducing the power consumption by a given amount. This occurs extremely fast before the presence of the next 2 hertz signal on lead 320. Since we assumed that it would take the power consumed by two rooms of heat to drop the power below the desired level, a second pulse will be generated on lead 320 causing the 1-out-of-8 converter to advance to output 5. In similar manner, the output of Q goes low thereby shutting off the heat to the second zone which reduces the power consumption below the desired level thereby preventing the deliverance of any more pulses on lead 320. Keep in mind, however, that although zones 4 and 5 have their heat shut off, the 16 second time period which arose with the first pulse continues on and times out. Thus, the heat in those two rooms is off for approximately 16 seconds. At the end of the 16 second period, these heaters are turned back on and if the power consumption resumes its same excessive value, one or more pulses are generated on lead 320 and in similar fashion as above described, zone 6 is turned off for a 16 second period. (Assuming that zone 6 draws a level of power comparable to zones 4 and 5.) This cycling continues until the excessive power problem stops. It is to be noted that if the power remains at its excessive level due to use by an appliance, every 16 seconds one or more zones are turned off and remain off until all zones are cycled. Due to the thermal lag of the walls of the house, no perceptive heat loss will be noted by the inhabitants. In similar fashion, it can be seen how 3 or 4 or 5 or 6 zones can be selectively turned off to accommodate for the excessive use. This will continue until some appliance in the household is turned off.

In the event that all eight zones are turned off, $\bar{Q}$ for all flip-flops is high, and NAND-gate 530 delivers a low at its output to an inverter 540 which converts it into a high signal on lead 542. If the remaining inputs to NAND-gate 544 are high, then the output of 544 on lead 546 delivers a latch signal for NAND-gate 548 and flip-flop 552 in a fashion as previously discussed for NAND-gate 510 and quad flip-flop 514. This now generates a control signal at the output of Q for the hot water heater in USERS 2.

The above discussion was presented assuming that the remaining inputs to NAND-gate 544 were high. The first of these remaining inputs appears on lead 362 which is from the comparator circuit 316. The wave appearing on 362 was shown in curve 486 to be a low to high transition whenever the power being measured is greater than the desired power level. The second input to gate 544 is derived from the pulse signals appearing on lead 320. These pulses enter a circuit 560 which convert the negative 2 Hz pulses into positive going spikes as shown in graph 562. These pulses are delivered to the NAND-gate 548 flip-flop 552 combination to latch in the Q equals low state.

It is readily obvious that NAND-gate 548-flip-flop 552 combination can be substituted with the hex counter 500 and 1-out-of-8 converter 504 to provide the necessary decoding action in the event that there are more users than just the one shown in USERS 2. Such an arrangement would become activated only upon a high signal appearing on lead 542 and a high signal appearing on lead 362.

While it is not shown in FIG. 5, in FIG. 3 this approach can be expanded into any number of users groups by following the approach set forth in FIG. 5.

Figure 6:
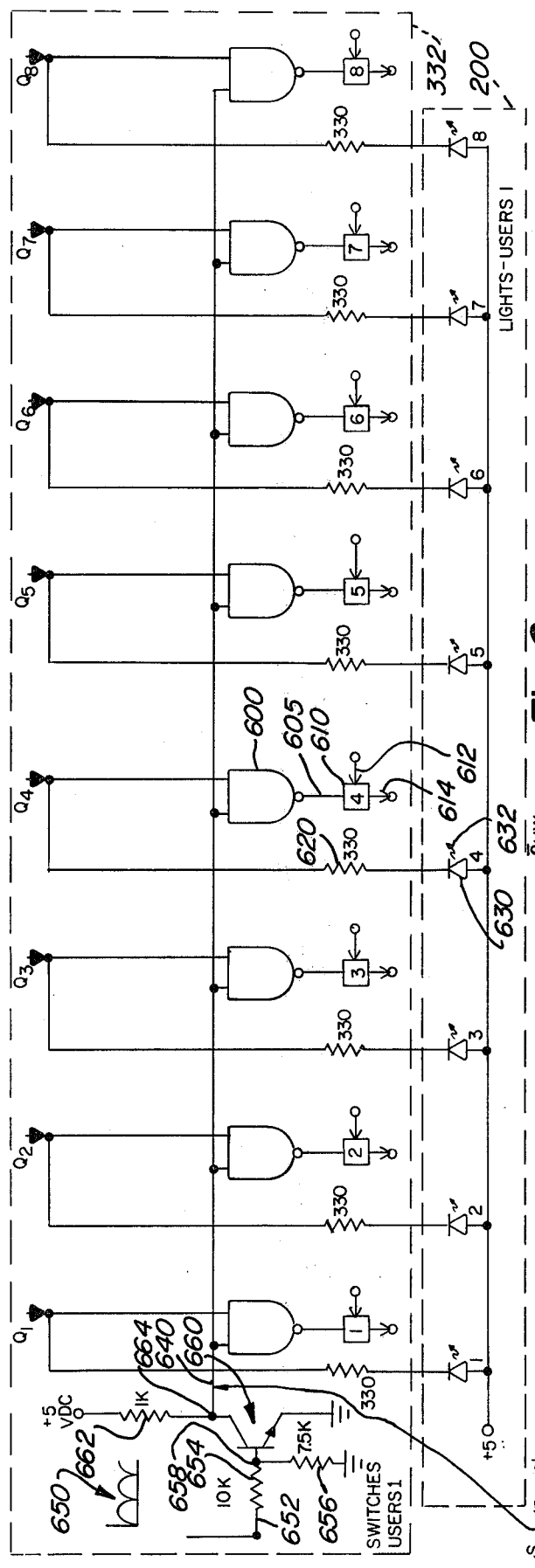
FIG. 6 is a detailed schematic representation of the switches and lights for the USERS 1 portion of the energy controller of the present invention.

In FIG. 6 are shown the details of the switches 332 and the light 200. As mentioned, a user is deactivated (i.e., power is not delivered to the user) whenever a Q output of the quad flip-flop corresponding to the user is in the low state. In FIG. 6, the Q outputs for the corresponding flip-flops 1 through 8 are shown entering the switches 332. Returning to our original example of deactivating the fourth zone of heat, Q4 is held low thereby causing the out-put of NAND-gate 600 to be high. Whenever the output of NAND-gate 600 is high, the solid state switch 610 is held in the deactivated state. A conventional switch 610 may be that manufactured by OPTO-22. In other words, a high output on lead 605 results in no delivery of power between leads 612 and 614. Line 612 corresponds to the L1 coming from the circuit breaker to the solid state switch 610 while line 614 delivers the power from the solid state switch to the user. A high condition on lead 605 turns the switch off preventing delivery of power. Simultaneously, the low condition at Q4 is delivered through a resistor 620 which is in series with a light emitting diode 630. A low condition at Q4 biases the light emitting diode 630 to the ON condition thereby generating light 632 indicating that the device has been turned OFF. As previously discussed, the low condition at Q4 is held in a steady state until the 16 second time period goes away. This is true regardless of the signal appearing on lead 640.

In the situation when Q4 is held high (i.e., the device is not to be turned OFF), then the voltage appearing on lead 640 controls the operation of the solid state switch 610. A full wave rectified voltage 650 is delivered onto lead 652 being generated in a conventional fashion from the power appearing at the breaker panel. That full wave rectified voltage is delivered into a resistor divider composed of resistor 654 and 656. Node 658 of the divider is connected into the base of a transistor 660 whose emitter is grounded. The collector of transistor 660 is delivered through resistor 662 to a +5 VDC source. Transistor 660 produces at node 664 curve 670 which is a series of positive going pulses which are 2 milliseconds wide with 8.33 milliseconds between each successive pulse leading edge. The pulse is symmetrical about the zero crossing of the AC voltage appearing at the circuit breakers. These positive going pulses are delivered onto lead 640 and cooperate with the high appearing at Q4 to produce a low at the output of NAND-gate 600 on lead 605 whereby to turn the solid state switch 610 to the ON state. The nature of the solid state switches 610 are such that the device must be turned on for each half wave. The positive going pulses shown in curve 670 serve to activate the solid state device into the ON state so that full power is transmitted to the user.

Figure 7:
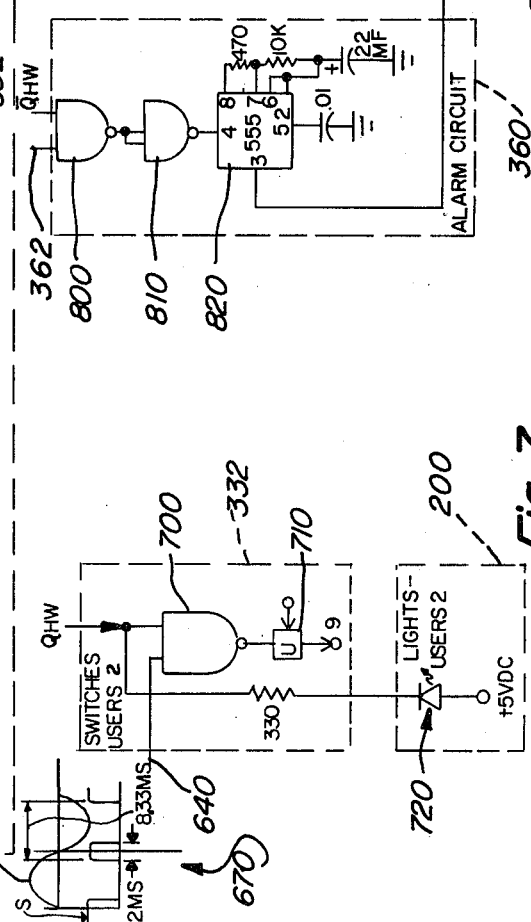
FIG. 7 is a detailed schematic representation of the switches and lights for the USERS 2 portion of the energy controller of the present invention.

In FIG. 7, is shown the comparable circuitry for USERS 2 as that discussed above. Whenever the Q output of the hot water latch 552 is low, NAND-gate 700 causes the solid state switch 710 to be in the off or deactivated state. As above, the pulses appearing on lead 640 at all other times cause the solid state switch 710 to be on. In addition, a comparable light emitting diode 720 is activated whenever $Q_{hw}$ is in the low state.

Figure 8:
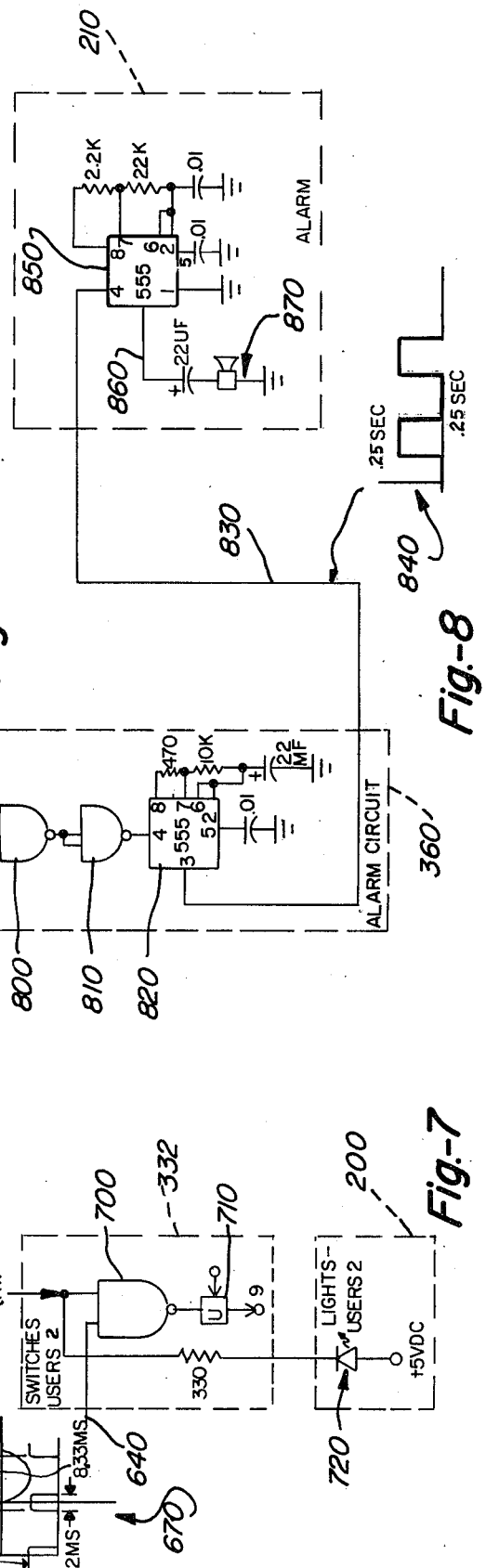
FIG. 8 is a detailed schematic representation of the alarm circuit and the alarm of the energy controller of the present invention.

In FIG. 8 is shown the details of the alarm circuit 360 located in switching panel 50 and the alarm located in the controller area 80. Whenever the output Q of the hot water latch is low, power to the hot water heater as previously discussed is prevented. In that state, $\overline{Q}$ output of the hot water latch is high and is delivered into NAND-gate 800. If the signal on lead 362 is high, which it is if the measured power exceeds the predetermined power, then the output of NAND-gate 800 is low which is inverted by gate 810 to deliver a high condition to the timing integrated circuit 820. The integrated circuit is shown interconnected with the appropriate components so that at its output 830, a series of positive going pulses is generated as shown by curve 840. These pulses are approximately of ¼ second duration and are delivered into the alarm circuit 210 located at the controller panel 80. These signals in turn activate a second timing integrated circuit 850 which is appropriately interconnected with resistors and capacitors to output an approximately 3 hilohertz signal on lead 60 to drive a horn 870 in a conventional fashion.

Although the present invention has been described with a certain degree of particularity, it is understood that the present disclosure has been made by way of example and that changes in details of structure may be made without departing from the spirit thereof.

What is claimed is:

1. An improved method for controlling power consumption in a building having a group of electrical users, said method having the steps of (a) preselecting a level of power consumption, and (b) determining when the actual power consumption of said building exceeds the preselected level of power consumption, said improved method further comprising the steps of:
   (c) turning OFF power in cyclic order to enough users to lower the actual power consumption below the preselected level of power consumption in response to said determination and for only a predetermined time interval, the power being turned off to the aforementioned users whether or not said users are actually using power,
   (d) turning ON power to all of the users in step (c) whose power was turned OFF in response to the termination of said predetermined time interval, and
   (e) continually repeating steps (a) through (d) for different users next in said cyclic order so that said users are uniformly rotated in being turned OFF.

2. An improved method for controlling power consumption in a building having separate electrical heating circuits, said method having the steps of (a) preselecting a level of power consumption for said building, and (b) determining when the actual power consumption of said building exceeds the preselected level of power consumption, said improved method further comprising the steps of:
   (c) turning OFF power in cyclic order to enough heating circuits to lower the actual power consumption below the preselected level of power consumption in response to said determination and only during a predetermined time interval, said predetermined time interval being less than the thermal time lag of the walls of said building,
   (d) turning ON power to all of those heating circuits whose power was turned OFF in step (c) when said predetermined time interval terminates, and
   (e) continually repeating steps (a) through (d) for different heating circuits next in said cyclic order so that said heating circuits are uniformly rotated in being turned OFF.

3. An improved method for controlling power consumption in a building having a first group of electrical users termed USERS 1 and a second group of electrical users termed USERS 2, said method having the steps of (a) preselecting a level of power consumption for said building, and (b) determining when the actual power consumption of the building exceeds the preselected level of power consumption, said improved method further comprising the steps of:
   (c) turning OFF power in cyclic order to enough users in USERS 1 to lower the actual power consumption below the preselected level of power consumption in response to the above determination and only during a predetermined time interval,
   (d) turning OFF power to at least one user in USERS 2 only when all users in USERS 1 are turned OFF in step (c) and only when the actual power consumption exceeds the preselected level of power consumption, (e) turning ON power to all USERS 1 and 2 in steps (c) and (d) whose power was turned OFF in response to the termination of the time interval, and (f) repeating steps (a) through (e) for different users in USERS 1 next in said cyclic order so that all users in USERS 1 are uniformly rotated in being turned OFF.

4. An improved method for maintaining power consumption in a building having separate electrical heating circuits and an electrical appliance circuit, said method having the steps of (a) preselecting a level of power consumption for said building, and (b) determining when the actual power consumption of said building exceeds the preselected level of power consumption, said improved method further comprising the steps of:

(c) turning OFF power in a predetermined order to enough heating circuits to lower the actual power consumption below the preselected level of power consumption in response to said determination and only during a predetermined time interval, said predetermined time interval being less than the thermal time lag of the walls of said building, (d) turning OFF power to the appliance circuit only when all of the heating circuits are turned OFF in step (c) and only when the actual power consumption exceeds the preselected level of power consumption, (e) activating an alarm when the actual power consumption exceeds the desired level of power consumption and when the power is turned OFF to the appliance circuit in step (d), (f) turning ON power to all of those circuits in steps (c) and (d) whose power was turned OFF when said predetermined time interval terminates, and (g) continually repeating steps (a) through (f) for different heating circuits in said predetermined order so that each heating circuit is uniformly rotated in being turned OFF.

5. An improved method for maintaining power comsumption in a building having separate electrical heating circuit, said method having the steps of (a) preselecting a level of desired power consumption, (b) generating an electrical signal proportional to said preselected level of electrical power consumption, and (c) generating an electrical signal proportional to the level of electrical power being delivered to said building, said improved method further comprising the steps of:

(d) producing a first activation pulse when the magnitude of the delivered power level signal exceeds the magnitude of the preselected power level signal, (e) generating a time frame having a predetermined time duration in response to the production of the first activation pulse, said time duration being greater than the time for said activation pulse and less than the thermal lag time of the walls of said building, (f) turning OFF power to a first heating circuit in response to the production of the first activation pulse, (g) producing another activation pulse if the magnitude of the delivered power level signal still exceeds the magnitude of the preselected power level signal, (h) turning OFF power in cyclic order to the next heating circuit in response to the activation pulse produced in the aforesaid step, (i) repeating steps (g) and (h) throughout the duration of said time frame, (j) turning ON power to all of the heating circuits turned OFF in steps (f) and (h) when the time frame terminates, and (k) repeating steps (b) through (j) for different heating circuits in said cyclic order so that each heating circuit is accessed on a uniformly rotating basis.

6. An improved method for maintaining power consumption in a building having separate electrical heating circuits and an electrical appliance circuit, said method having the steps of (a) preselecting a level of power consumption, (b) generating an electrical signal proportional to said preselected level of electrical power consumption, and (c) generating an electrical signal proportional to the level of electrical power being delivered to said building, said improved method further comprising the steps of:

(d) producing a first activation pulse when the magnitude of the delivered power level signal exceeds the magnitude of the preselected power level signal, (e) generating a time frame having a predetermined time duration in response to the production of the first activation pulse, said time duration being greater than the time for said activation pulse and less than the thermal time lag of the walls of said building, (f) turning OFF power to a first heating circuit in response to the production of the first activation pulse and the generation of the time frame, (g) producing another activation pulse if the magnitude of the delivered power level signal still exceeds the magnitude of the preselected power level signal, (h) turning OFF power in a predetermined order to the next heating circuit in response to the activation pulse produced in the aforesaid step, (i) repeating steps (g) and (h) throughout the duration of said time frame, (j) turning OFF power to the appliance circuit only when all heating circuits are turned OFF in step (i) and only when another activation pulse is generated, (k) turning ON power to all of the circuits in steps (f), (h) and (j) whose power was turned off when said predetermined time interval terminates, and (l) continually repeating steps (a) through (k) for different heating circuits in said predetermined order so that said heating circuits are uniformly turned OFF.

7. An improved energy demand controller, said controller having means for delivering electrical power to said building, a plurality of users of said electrical power, means receptive of said delivered power for extending said power on a separate circuit to each of said plurality of users, means cooperative with said delivering means for generating a signal proportional to the amount of instantaneous power being delivered to said building, and means for generating a signal representative of a preselected amount of a power, said improved controller further comprising:

means receptive of said instantaneous power signal and of said preselected power signal for producing a series of activation pulses only when the magnitude of said instantaneous power signal exceeds the magnitude of said preselected power signal, means operative upon receipt of the first activation pulse for generating a time interval of predetermined duration, said duration being less than the thermal time lag of the walls of said building, means operative upon receipt of said pulses and the beginning of said time interval for preventing the extension of said power only during the duration of said interval in cyclic order to the number of said separate circuits in said extending means as are required to reduce the magnitude of said instantaneous power signal below the magnitude of said preselected signal, said preventing means being further responsive to the termination of said time interval for extending said power to all of the aforesaid number of circuits, said preventing means being capable in the next predetermined time interval for preventing power to the next circuits in said cyclic order.

8. An improved energy demand controller for controlling electrical power consumption by a plurality of users in a building, said controller having means for delivering electrical power to said building, means receptive of said delivered power for extending said power in a separate circuit to each user in said building, means cooperative with said delivering means for generating a signal proportional to the amount of instantaneous power being delivered to said building, and means for generating a signal representative of a preselected amount of power, said improved controller further comprising:

means receptive of said instantaneous power signal and of said preselected power signal for producing a series of activation pulses whenever the magnitude of said instantaneous power signal exceeds the magnitude of said predetermined power signal, means operative upon receipt of said activation pulses for preventing the delivery of power to as many of said separate circuits in a predetermined first group of said users as is necessary to reduce the magnitude of said instantaneous power signal below the magnitude of said preselected signal, said preventing means being capable of preventing the delivery of power to a predetermined second group of said users only when all of said users in said first group are prevented said power and only upon receipt of said pulses, and means operative when all of said users in said first group and at least one of said users in said second group are prevented said power for sounding an alarm and upon receipt of an activation pulse.

9. An improved energy demand controller for controlling electrical power consumption having means for delivering electrical power to said building, means receptive of said delivered power for extending said power in a separate circuit to each user in said building, means cooperative with said deliverying means for generating a signal proportional to the amount of instantaneous power being delivered to said building, and means for generating a signal representative of a preselected amount of power, said improved controller comprising:

means receptive of said instantaneous power signal and of said preselected power signal for producing a series of activation pulses only when the magnitude of said instantaneous power signal exceeds the magnitude of said predetermined power signal, means operative upon receipt of the first activation pulse for generating a time interval of predetermined duration, means operative upon receipt of said activation pulses and the beginning of said time interval for preventing the delivery of power in cyclic order to as many of said separate circuits in a predetermined first group of said users as is necessary to reduce said instantaneous power signal below said preselected signal, said preventing means preventing the delivery of power to a predetermined second group of said users only when all of said users in said first group are prevented said power and upon receipt of said pulses, said preventing means being operative only during said time interval, and means operative when all of said users in said first group and said second group are prevented said power and upon receipt of an activation pulse for sounding an alarm.

10. An improved energy controller for a building, said building having electrical power lines delivering power to a plurality of electrical circuits in said building, said electrical circuits including a group of heater circuits and a circuit breaker box containing a circuit breaker for each of said electrical circuits, said controller having means cooperative with said electrical power lines for generating a signal proportional to said delivered power, and means for generating a signal proportional to a predetermined power limit, said improved controller further comprising:

means receptive of said delivered power signal and of said power limit signal for producing a series of activation pulses whenever the delivered power to said building exceeds the predetermined limit, said series of activation pulses being generated at a fixed frequency, means operative upon receipt of the first activation pulse of said series of pulses for providing a time interval of predetermined duration, said time interval being less than the thermal time lag of the walls of said building and greater than the time period of a single activation pulse, and means operative with the beginning of said time interval and receptive of said series of activation pulses for sequentially preventing the delivery of power to a different heater circuit according to a cyclic order for each activation pulse received in said series, said preventing means being further responsive to the termination of said time interval for becoming disabled thereby allowing delivery of power to all of the aforesaid circuits whose power was prevented during said time interval.

11. The improved energy controller of claim 10 wherein said predetermined power limit generating means is selectively capable of a plurality of different predetermined power limits.

12. The improved energy controller of claim 11 wherein said predetermined power limit generating means is a thumbwheel switch located on the inside of said building.

13. The improved energy controller of claim 10 wherein said producing means comprises:

a comparator circuit receptive of said power limit signal and of said delivered power signal for outputting a shed level indication only when said delivered power exceeds said power limit, and a timing circuit operative upon receipt of said shed level indication for generating said activation pulses.

14. The improved energy controller of claim 10 wherein said time interval providing means comprises a timer operative upon receipt of the first activation pulse of said series of pulses for generating a square-wave pulse of said predetermined duration.

15. The improved energy controller of claim 10 wherein said preventing means comprises:

means receptive of each activation pulse in said series for outputting a control signal uniquely corresponding to a different heat circuit, said outputting means being capable of providing a control signal for each heater circuit on a uniform cyclic rotating basis, and means in each heater circuit responsive to its control signal for switching OFF the power delivery to the aforesaid circuit.

16. The improved energy controller of claim 15 wherein said control signal outputting means comprises:

a counter receptive of each activation pulse in said series for providing a unique digital address for a heater circuit, said counter being capable of sequentially advancing from address to address with each activation pulse so that each heater circuit is addressed on a uniform rotating basis, and a converter responsive to said addresses from said counter for extending said control signals to said switching means.

17. The improved energy controller of claim 15 wherein each of said switching means is responsive to said termination of said time interval for switching ON said power delivery.

* * * * *